(12) United States Patent
Moore et al.

(10) Patent No.: US 8,489,481 B2
(45) Date of Patent: Jul. 16, 2013

(54) TRANSACTION PROCESSING AND REMOTE ACTIVATION

(75) Inventors: Jesse Keith Barton Moore, Toronto (CA); Nicholas Hughes, Alresford (GB)

(73) Assignee: M-Kopa IPR, LLC, Wilmington, DE (US)

( * ) Notice: Subject to any disclaimer, the term of this patent is extended or adjusted under 35 U.S.C. 154(b) by 0 days.

(21) Appl. No.: 13/494,944

(22) Filed: Jun. 12, 2012

(65) Prior Publication Data

US 2013/0132267 A1    May 23, 2013

Related U.S. Application Data

(60) Provisional application No. 61/562,323, filed on Nov. 21, 2011.

(51) Int. Cl.
*G06Q 40/00* (2012.01)
*G06Q 20/10* (2012.01)
*G06Q 50/06* (2012.01)

(52) U.S. Cl.
CPC ........... *G06Q 40/00* (2013.01); *G06Q 20/10* (2013.01); *G06Q 50/06* (2013.01)
USPC ............ 705/35; 705/14.64; 705/38; 194/210

(58) Field of Classification Search
CPC .......... G06Q 40/00; G06Q 20/10; G06Q 50/06
USPC ............... 705/14.64, 35, 38; 194/210
See application file for complete search history.

(56) References Cited

U.S. PATENT DOCUMENTS 6,535,726 B1 * 3/2003 Johnson ................ 455/406
7,362,213 B2   4/2008 Cohen
(Continued)

FOREIGN PATENT DOCUMENTS

| JP | 2004-220350 A | 8/2004 |
| KR | 10-2007-0055106 A | 5/2007 |
| WO | 02/33669 A1 | 4/2002 |
| WO | 2004/049585 A1 | 6/2004 |

OTHER PUBLICATIONS

Hara, Y. (2004). Sharp sees big picture for solar outdoor lighting. Electronic Engineering Times, (1335), 22-22. Retrieved May 24, 2013.*

(Continued)

*Primary Examiner* — Kito R Robinson
(74) *Attorney, Agent, or Firm* — Christensen O'Connor Johnson Kindness PLLC

(57) ABSTRACT

An apparatus comprising equipment provides a principal functionality other than two-way communication. A computing device in the apparatus controls the equipment. The apparatus operates in a plurality of modes including an operational mode and a paid off mode. When the apparatus is in the operational mode, the computing device communicates with a remote computer and in response, receives an instruction that is based on a state of a financial account. Based on the received instruction, the computing device controls whether the equipment provides the principal functionality. When the apparatus is in the paid off mode, the equipment provides the principal functionality without being controlled by the computing device based on the state of the financial account. The apparatus transitions from the operational mode to the paid off mode based on a wireless communication from the remote computer resulting from an amount owed in the financial account being paid off.

20 Claims, 5 Drawing Sheets

U.S. PATENT DOCUMENTS

| | | |
|---|---|---|
| 2002/0128932 A1* | 9/2002 | Yung et al. ............. 705/27 |
| 2005/0131810 A1 | 6/2005 | Garrett |
| 2006/0031180 A1* | 2/2006 | Tamarkin et al. ........ 705/412 |
| 2007/0061268 A1 | 3/2007 | Herold |
| 2008/0319908 A1* | 12/2008 | Venkatachalam et al. ..... 705/50 |
| 2009/0132805 A1 | 5/2009 | Ginter |
| 2010/0179708 A1 | 7/2010 | Watson |
| 2011/0004570 A1 | 1/2011 | Saad |
| 2011/0015797 A1 | 1/2011 | Gilstrap |
| 2012/0232714 A1 | 9/2012 | Ricket |

OTHER PUBLICATIONS

International Search Report and Written Opinion mailed Aug. 4, 2011, in International Application No. PCT/IB2011/000998, filed May 10, 2011, 12 pages.

International Search Report and Written Opinion mailed Mar. 27, 2013, in International Application No. PCT/US2012/066136, filed Nov. 20, 2012, 8 pages.

\* cited by examiner

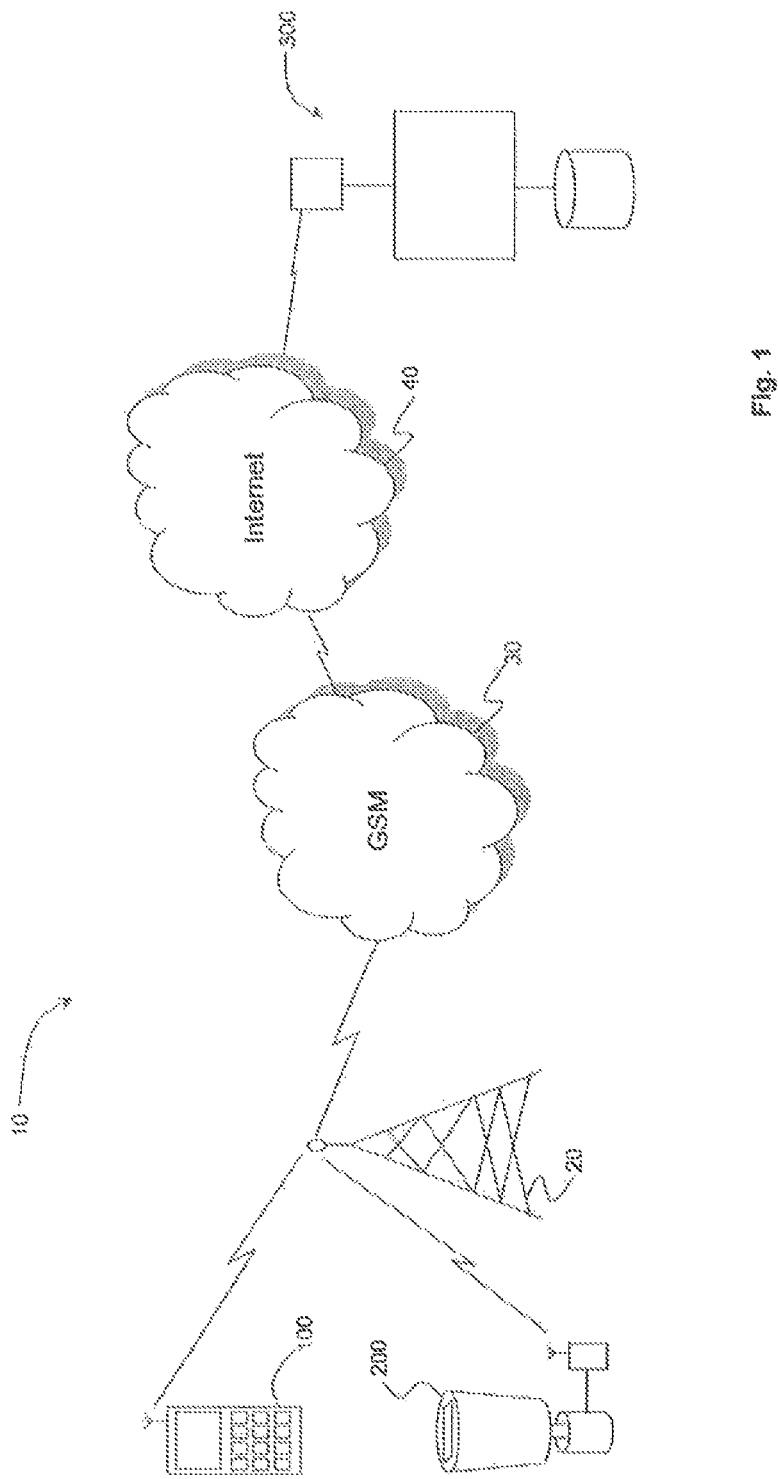

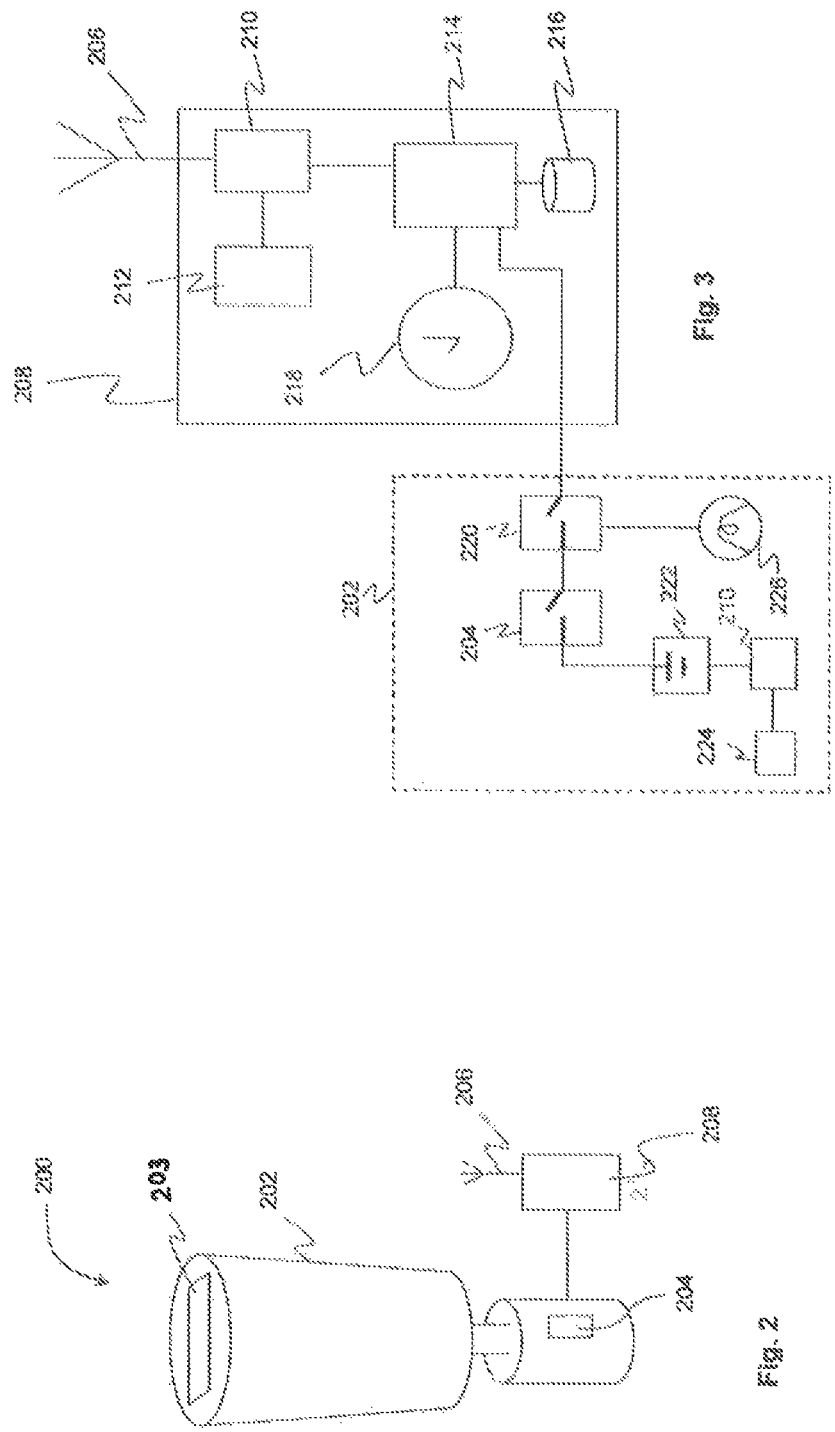

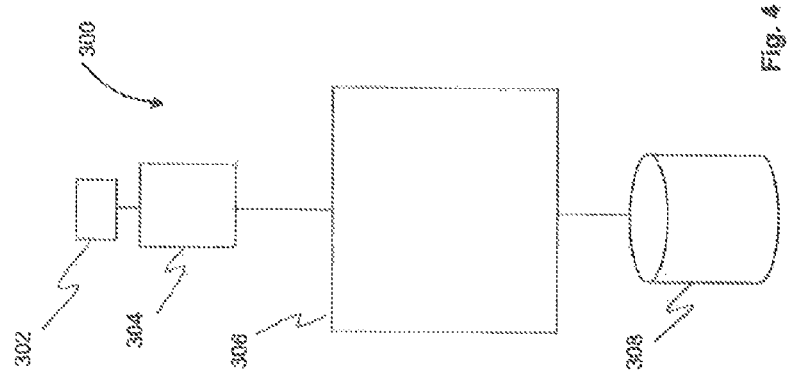
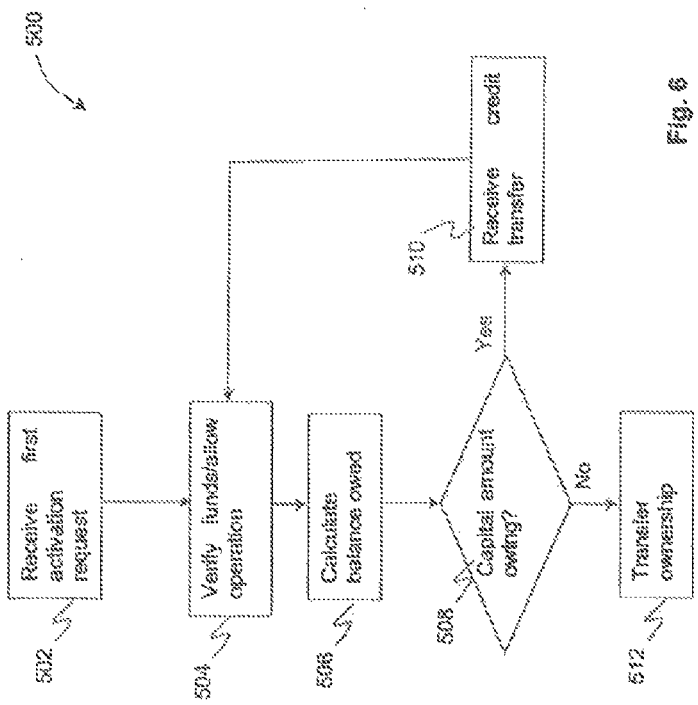

TRANSACTION PROCESSING AND REMOTE ACTIVATION

CROSS-REFERENCE TO RELATED APPLICATION

This application claims the benefit of U.S. Provisional Application No. 61/562,323,filed Nov. 21, 2011,which is hereby incorporated by reference in its entirety.

FIELD OF INVENTION

Embodiments of the invention relate to the operation of a device and include various operational states in the device that depend on local and/or remote events or input.

BACKGROUND

The vast majority of the human population earns very little money. With a low regular income, it is difficult for many people to amass sufficient capital to purchase needed assets. A number of arrangements have been developed to address this problem. For example, one arrangement permits a person desiring to purchase an asset or a service to pay a portion of the price over time in a number of payments. When the price has been paid off, the person is provided with possession of the asset or the service is rendered. In some cases, use of the asset or service is permitted while payments are being made. As an alternative, a number of credit facilities have developed which include microfinance hire purchase agreements, etc.

These known arrangements suffer from the disadvantage that it may take significant time for the purchaser to pay off the purchase price. Financing arrangements suffer from the disadvantage of being costly to implement and administer, and can be difficult to enforce, particularly in a rural environment. Often, the purchaser will end up paying significantly more than the purchase price to cover the administration costs.

A further problem exists, particularly in developing economies, whereby once an asset has been purchased, insufficient planning is made to ensure for the maintenance of that asset. Therefore, assets which might otherwise be easily repaired are neglected to such an extent that repair becomes more expensive.

SUMMARY

The following description briefly summarizes certain aspects of the disclosure herein. This summary is not intended to identify all features or implementations disclosed herein, nor is it intended to identify key features or otherwise be used to define the scope of the invention claimed hereafter.

Disclosed herein are embodiments of a device that has various operational states that are dependent on local and/or remote events or input. The device may be an asset that is purchased or which provides a service that may be purchased, which can be controlled through local events or input and/or remote events or input. For example, a device may include communication circuitry that enables it connect to a remote transaction processing system via a communications link, using for example a cellular communications network. The transaction processing system receives user payments for use of the device, possibly by way of a different communications link, and communicates with the device to permit use of the device when the user has successfully paid for such use. Operational states in the device take into account such communication from the transaction processing system, as well as local input received from the user of the device and/or local events, such as depletion of charge of a battery in the device.

DESCRIPTION OF THE DRAWINGS

The foregoing aspects and many of the attendant advantages of the invention will become more readily appreciated as the same become better understood by reference to the following detailed description, when taken in conjunction with the accompanying drawings, wherein the drawings are described as follows:

FIG. 1 illustrates a communication system according to an embodiment of the invention;

FIG. 2 illustrates a solar-powered lamp according to an embodiment of the invention;

FIG. 3 illustrates a portion of the solar-powered lamp of FIG. 2;

FIG. 4 illustrates a transaction processing system according to an embodiment of the invention;

FIG. 6 illustrates a further process according to an embodiment of the invention.

DETAILED DESCRIPTION

Figure 5:
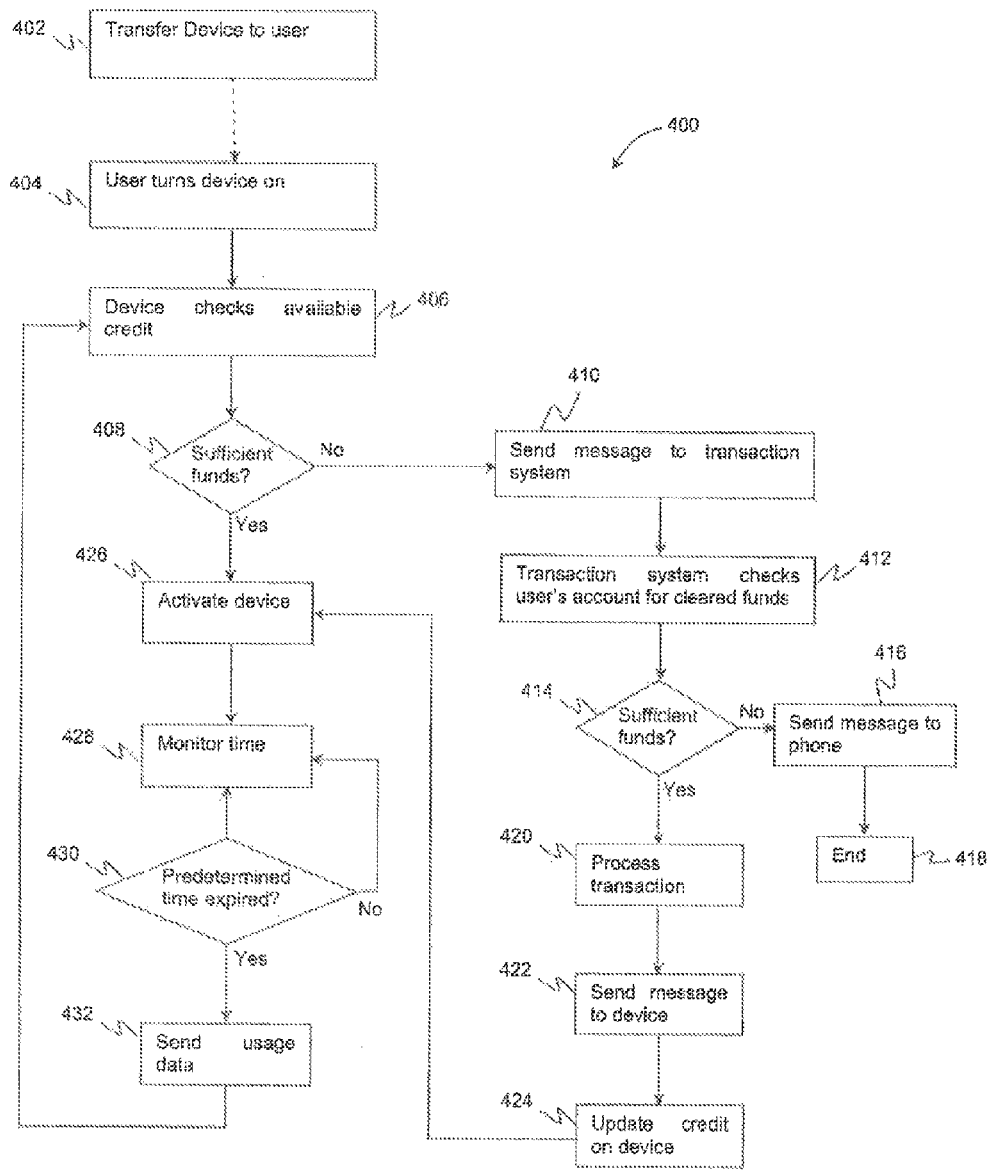
FIG. 5 illustrates a process of setting an operational state of the solar-powered lamp of FIG. 2 according to an embodiment of the invention.

In the following description, it should be understood that the figures are schematic in nature and not drawn to scale, and are intended for illustrative purposes.

FIG. 1 illustrates a communication system 10 according to an embodiment of the invention. The communication system 10 includes a user interface, and in this embodiment, a mobile communications device in the form of a cellular telephone 100 configured to communicate via a cellular phone mast 20. In the embodiment shown, a device 200 (in this case, a solar-powered lamp) is also configured to communicate via the cellular phone mast 20.

The cellular phone mast 20 may be part of any type of cellular communications network, such as a GSM communications network generally denoted by reference 30 in FIG. 1. In a preferred embodiment, GSM communications network 30 is further configured to communicate via the Internet 40. A transaction processing system 300 is configured to communicate with the cellular telephone 100 and the solar-powered lamp 200 via the Internet 40 and the GSM communications network 30.

In the embodiment illustrated in FIG. 1, the cellular telephone 100 and the solar-powered lamp 200 communicate with the same cellular phone mast 20, though it should be understood that embodiments of the invention are not limited in this respect In other embodiments, the user interface (in this case, the cellular telephone 100) and the device (in this case, the solar-powered lamp 200) communicate with distinct and separate masts or communicate via other communication hardware and protocols.

Referring back to FIG. 1, the solar-powered lamp 200 communicates via the GSM communications network 30, as indicated. It should therefore be understood that the solar-powered lamp 200 is provided with the necessary radio transmitters and receivers, as well as a Subscribers Identity Module (SIM) and the other necessary hardware and software to the device to communicate via the GSM network, as described in greater detail below. The solar-powered lamp 200 interacts with the GSM communications network 30 in a manner similar to known cellular devices, such as the cellular telephone 100. In the illustrated embodiment, the cellular telephone 100 and the solar-powered lamp 200 communicate with the GSM communications network 30 through the use of general packet radio service (GPRS). Nevertheless, the manner in which this communication, or any other communication described herein, occurs is not essential to the operation of embodiments of the invention. In further embodiments, other wireless or wired communications protocols and networks may be used, including for example USSD codes, XHTML, WiFi, etc.

FIG. 2 illustrates the solar-powered lamp 200 in greater detail. As will be appreciated from the following description, the lamp 200 provides a principal functionality other than two-way communication, namely the lamp 200 provides light when activated. The solar-powered lamp 200 includes a lamp portion 202 which has an activation switch 204. The lamp portion 202 is connected to a control unit 208. The lamp portion 202 further comprises a photovoltaic cell 203. The photovoltaic cell 203 operates to charge a battery within the solar-powered lamp 200 (see below) during exposure to sunlight so that the lamp 200 may operate when there is little or no ambient light. A user uses the activation switch 204 as an interface to turn the solar-powered lamp 200 on and off. However, the lamp 200 will not activate (become functional) unless the control unit 208 allows this, in the manner described below.

The control unit 208 of the solar-powered lamp 200 is illustrated in greater detail in FIG. 3. As illustrated, the control unit 208 comprises an antenna 206 connected to a modem, in this case a radio unit 210 which is, in turn, connected to a SIM 212. The antenna 206, radio unit 210, and SIM 212 operate together in a known manner so that the solar-powered lamp 200 (FIG. 2) may communicate via the GSM communications network 30 with a remote computer, such as a transaction processing system 300 (FIG. 1), at a remote site. The radio unit 210 is further connected to a processor 214 having storage 216. In this embodiment, the processor 214 is shown connected to a timer 218.

The control unit 208 is connected to the lamp portion 202 of the solar-powered lamp 200 (illustrated in this figure by dashed outline). The processor 214 is connected to a switch 220 which is in turn connected to a bulb 226. The activation switch 204 is connected to the processor 214 via the switch 220 and to a battery 222. The battery 222 powers the lamp portion 202 and provides electrical power to the bulb 226. Separately, the battery 222 also powers the radio unit 210, processor 214, and the other components of the solar-powered lamp 200 which require electrical power. The battery 222 is recharged by the photovoltaic cell 203. The battery 222 is independent of a wired power supply and therefore the lamp 200 is portable and may be used in areas that have no main electricity supply or when the main electricity supply is intermittent or otherwise unavailable.

In the illustrated embodiment, the lamp portion 202 further comprises an ammeter 224 that measures the current drawn from, and delivered to, the battery 222. The processor 214 is communicatively connected to the ammeter 224 and receives readings made by the ammeter 224 which may be stored by the processor 214 in storage 216. Alternatively, other circuitry as known in the art may be provided for monitoring the charge level of the battery 222.

As will be described in greater detail below, the lamp 200 is configured with various operational states that depend, in part, on local and remote input. In one operational state, the bulb 226 of the lamp 200 will operate only if the user has activated the switch 204 to place the switch in an "on" position and the processor 214 has activated the switch 220 to place the switch also in an "on" position. In this manner, the processor 214 determines whether or not the lamp is operational even after a user has turned it on.

Furthermore, the processor 214 controls the radio unit 210 and thereby controls the manner and content of the communications of the solar-powered lamp 200 over the GSM communications network 30 (FIG. 1). The processor 214 utilizes storage 216 during its operations in a known manner. In at least one embodiment, the storage 216 is configured to store an indication of the amount of time that the solar-powered lamp may operate in the form of a credit. In the manner disclosed below with reference to FIG. 5, the user transfers credit from the transaction processing system 300 to the lamp 200. The storage 216 keeps a record of the available credit and the processor 214 reduces the available credit as the lamp 200 is used. The processor 214 uses the timer 218 to track the usage of the lamp 200 and for ancillary purposes such as for date and time stamping communications. In various embodiments, this timing information, together with the current information obtained from the ammeter 224, is stored in the storage 216 and transferred as usage information to the transaction processing system 300 in the manner described below.

FIG. 4 illustrates a transaction processing system 300 that comprises a connection unit 304 having, in this case, an IP connection socket 302. The transaction processing system 300 communicates with the Internet 40 in a manner known in the art by utilizing the socket 302 and the connection unit 304. In alternate embodiments, this connection is accomplished by communications protocols other than IP-related protocols, such as a GSM connection via a SIM card connected to the mobile network. In the illustrated embodiment, the communication link between the transaction processing system 300 and the lamp 200 is different than the communication link between the transaction processing system 300 and the cellular telephone 100.

The transaction processing system 300 further comprises a processing unit 306 which controls the transaction processing system 300. The processing unit 306 is connected to storage 308 which is used to store data in the form of a database and associated data storage. It should be understood that the transaction processing system 300 illustrated in FIG. 4 is in a schematic form and many alternative ways of implementing such a system are known in the art.

In the embodiment illustrated, the transaction processing system 300 allows users to retain credit in personal accounts and transfer money into and out of such accounts, as well as between accounts within the transaction processing system and accounts held elsewhere. As such, the transaction processing system 300 is similar to known banking systems. The transaction processing system 300 furthermore allows users to operate their accounts (i.e., transfer amounts and purchase goods or services using money stored in their accounts) through various communication links, such as by use of a cellular telephone. Such transaction processing systems are known in the art, for example, the system operated in Kenya by GSM mobile operator Safaricom Limited, under the trade name "M-PESA".

In certain embodiments, the transaction processing system 300 may be arranged so that a user may optionally utilize funds stored in the transaction processing system to pay for use of a service or device, such as the solar-powered lamp 200 discussed earlier. In alternative embodiments, the transaction processing system 300 is primarily used by the operator of the GSM communications network to allow a user to pay for the use of their cellular telephone and, in this embodiment, credit used primarily to pay for use of the cellular telephone may, in addition, be used to pay for usage of the device in a manner analogous to that described below with reference to FIG. 5.

The transaction processing system 300, by communicating via the Internet 40 through the IP connection unit 304, is able to control certain operational aspects of the solar-powered lamp 200, which is also connected to the Internet 40 via GSM communications network 30. The manner in which this occurs is described in greater detail below with reference to FIG. 5.

FIG. 5 illustrates a process 400 in which an operational state of the solar-powered lamp 200 is controlled by the transaction processing system 300 on request by a user (not shown) interacting with the transaction processing system 300 by way of, for example, the cellular telephone 100.

At a preliminary step 402, the device (which, in this case, is the solar-powered lamp 200) is transferred to the user. In the embodiment illustrated, the preliminary step may involve a user paying a deposit to a supplier who, in return, supplies the user with the device. The deposit may be less (in many instances, significantly less) than the capital cost of the device.

During this preliminary step 402, the user's possession of the lamp 200 will be registered. The registration involves establishing an association between the device (in this embodiment, identified by an identification number) and the user. In the illustrated embodiment, the user uses the cellular telephone 100 to interact with the transaction processing system 300 in order to operate the lamp 200. The registration process may involve establishing an association between the user's cellular telephone number and the identification number of the lamp 200.

At step 404, the user turns on the solar-powered lamp 200 by activating the activation switch 204 (FIG. 2). Steps 402 and 404 are linked by a dashed line 8 indicating that step 402 is a preliminary step in as much as step 402 will occur only once, whereas step 404 may occur many times during the lifespan of a device, such as the solar-powered lamp 200.

At step 406, the processor 214 of the lamp 200 detects operation of the switch 204 and checks the credit available for running the device by querying a record of that credit stored in a financial account in the storage 216 (FIG. 3). The process then proceeds to step 408 where a determination is made whether the credit stored in the storage 216 is sufficient to operate the device.

If the available credit is not sufficient, the process proceeds to step 410 where the lamp communicates a message to the transaction processing system 300 in a manner discussed above. The message sent by the lamp 200 to the transaction processing system 300 may include an identification number by which the transaction processing system 300 will be able to identify the lamp 200, as well as a request to process a payment for use of the lamp 200 for a predetermined time. In this embodiment, the predetermined time is 8 hours, though in other embodiments any time interval may be used.

At step 412, the transaction processing system 300 consults the account information held for the user who is determined, with reference to the identification number of lamp 200, to be the possessor of lamp 200. The transaction processing system 300 thereby determines the amount of funds which the user has available to pay for use of the lamp 200.

At step 414, a determination is made whether the user has sufficient funds. If the user does not have sufficient funds, the process moves to step 416 where a message is sent to the user's cellular telephone 100 informing them that they have insufficient funds, and reminding them to transfer additional funds. The process then ends at step 418. If the user subsequently transfers funds into his or her financial account, the user will be able to restart the process by activating the switch 204, in which case the process begins again at step 404.

If, on the other hand, at step 414 it is determined that the user has sufficient funds for the lamp 200 to operate, the process moves on to step 420 where the transaction processing system 300 processes the payment for the device. This may involve debiting the user's account in a manner known in the art, which need not be further described herein. In a further embodiment referred to above, this step may involve debiting credit which would ordinarily be used by the user to pay for use of the cellular telephone 100.

At step 422, the transaction processing system 300, sends a message to the lamp 200, such as by way of the IP connection unit 304 and socket 302. This message contains the identification number for the lamp together with an encrypted command to update the credit stored on the lamp 200 in storage 216.

At step 424, the lamp 200 receives the message sent by the transaction processing system 300. The processing unit 214 of lamp 200 verifies that the message was sent by the transaction processing system 300. In at least one embodiment, this is done by verifying an encryption key, but in other embodiments this may occur in any one of known ways for verifying the sender of a message. Once the processing unit 214 of lamp 200 has verified that the message did, in fact, originate from the transaction processing system 300, the processing unit 214 performs the command specified in the message by updating the credit record stored in storage 216.

In this example, the command issued by the transaction processing system 300 is to update the credit stored in the lamp 200. In further embodiments, the transaction processing system 300 may issue other commands relating to the operational state of the device being controlled. For example, the transaction processing system 300 may communicate with the user by causing the lamp to flash on and off indicating that there is insufficient credit in their account. Alternatively, where the device is a device other than a lamp, the command issued by the transaction processing system may relate to the operation of the device. Once the credit on the lamp has been updated, the process goes on to step 426 where the lamp (the device, in this embodiment) is activated (i.e., turned on) through the activation of the switch 220. Therefore, once switch 220 is activated, both switch 204 and switch 220 will have been activated, allowing the lamp to operate.

Referring back to step 408, if it is determined that there are sufficient funds stored in the device at this step, the process proceeds to step 426 where the lamp is activated and allowed to operate.

Once the lamp has been turned on in step 426, the process moves to step 428 where the lamp 200 monitors the time that has elapsed since the lamp 200 was turned on. Thereafter, the process proceeds from step 428 to decision step 430 to compare the elapsed time against the predetermined time. If the elapsed time is less than the predetermined time, the process returns to step 428 and then repeats the decision step 430. However, if the elapsed time is equal to, or greater than, the predetermined time, the process then proceeds to step 432.

In this embodiment, the predetermined time is the time which has been stored in the storage 216 associated with processing unit 214 of the solar-powered lamp 200 (as described above with reference to FIG. 3). Each time that the lamp 200 is activated, the lamp is activated for the predetermined time unless the user turns the lamp off through again activating switch 204 during this time, in which case the process will begin again at step 404. In a further embodiment, the predetermined time for the activation may form part of the message sent by the transaction processing system 300 in step

416. Alternatively, or in addition, the user may determine the predetermined time period and specify this as a parameter when communicating with the transaction processing system 300 with the cellular telephone 100.

Once it is determined at step 430 that the predetermined time has elapsed, the process proceeds to step 432 where usage information for the lamp 200 is sent to the transaction processing system 300. In the present example, the usage information is sent to the transaction processing system 300 once every 8 hours as the predetermined time period of step 430 has been set to 8 hours. The process then proceeds back to step 406 where a determination is made of the available credit stored in storage 216. In this manner, the lamp 200 keeps track of the continued use of the lamp and ensures that sufficient credit remains for its use. When the lamp runs out of credit, the process proceeds to step 410 to obtain credit from the transaction processing system 300 in the manner described above.

At any point during the process defined by steps 406, 408, 426, 428, 430 and 432, the user may operate switch 204 which pauses the process. When the user reactivates switch 204, the process continues from the same point where it was paused. In other embodiments, activation of the switch 204 causes the process to restart.

In a further embodiment, the operational state of the lamp 200 is changed from on to off by having the transaction processing system send a further command to the lamp 200 by message. In this embodiment, the transaction processing system 300 keeps track of the predetermined time period and, once this time period has elapsed, the transaction processing system 300 sends the message to turn the lamp 200 off.

Advantageously, with embodiments of the invention, the user is given possession of an asset, such as the solar-powered lamp 200, on payment of a deposit which is less than the cost of the device. The user will then pay for the use of the device for a predetermined time period and a portion of this cost will be attributed to the capital cost of the device. It will be understood that, as the user continues to use the device, more and more of the capital cost will be repaid until all of the capital cost has been paid off. At this time, ownership in the asset may be transferred to the user.

FIG. 6 illustrates a process 500 whereby the transaction processing system 300 determines whether a user has paid off the capital cost of the device (in this embodiment, the solar-powered lamp 200). At the initial step 502 of process 500, the transaction processing system 300 receives a request from the user to activate the lamp 200 in the manner described above with reference to the process of FIG. 5.

When this initial request is received, the process will continue on to step 504 wherein a determination is made of the funds which the user has available and, if those funds are sufficient, the operational state of the lamp 200 will be changed from off to on (also in the manner described above).

At step 506, the capital amount owing in respect of the lamp 200 by the user will be calculated. If in the previous step 504, it was determined that the user has sufficient funds to allow the use of the lamp 200, the capital amount owing will be reduced in step 506 by the portion of the amount charged to the user for the use of the lamp 200 which has been apportioned to paying back the capital amount.

At step 508, a determination is made of the capital amount still owing by the user. If this has reduced to zero, the process continues to step 512 where ownership in the lamp 200 is transferred to the user. In this embodiment, transfer of ownership may involve allowing the user to use the lamp 200 without requiring further payments. In order to facilitate this, the transaction processing system 300 sends a message to the lamp 200 which thereafter allows use of the lamp 200 without requiring payment.

In an alternative embodiment, ownership of the lamp 200 may entitle the user to a reduced cost for continued use of the lamp 200. In this embodiment, the usage costs may be processed as payments in respect of an insurance or maintenance policy covering repair of the lamp 200. The user will then be entitled to have the lamp 200 repaired, or be provided with a new lamp, should the lamp stop functioning.

Referring back to FIG. 6, if at step 508 it is determined that a portion of the capital amount is still outstanding, the process proceeds to step 510. At step 510, the transaction processing system awaits the next credit transfer from the user. When the credit transfer is received, the transaction processing system 300 returns to step 504 and verifies that the user has sufficient funds to allow usage of the lamp 200.

The usage information collected by the lamp 200 and transferred to the transaction processing system 300 in step 432 of FIG. 5 may be used to track how a user uses the lamp 200 or any other device in which embodiments of the invention have been implemented. Furthermore, this data may be used, in particular when the device relies on "renewable energy" such as solar or wind power, to calculate carbon offsets and apply them for that user or for an organization affiliated with that user. In this manner, the transaction processing system 300 can continuously monitor and charge for usage of the lamp 200 until such time as the user has paid back the cost of the lamp.

In the embodiment illustrated and described above, the transaction processing system 300 interacts with the solar-powered lamp 200 to allow activation of the solar-powered lamp 200. In further embodiments, the control unit of the solar-powered lamp 200 operates to collect information regarding the usage and state of the solar-powered lamp 200 and communicate this information to the transaction processing system 300 or to a further remote location where this information is stored and collated. In such embodiments, the solar-powered lamp 200 will include the necessary sensors and storage medium to allow collection of the data.

As discussed above, the present application describes a device for which a user can pay for over time. In the illustrated embodiment, a unique mobile-enabled solar-powered lamp is configured to allow a user to purchase the lamp on a "pay as you go" basis, providing more affordable access to clean light and power.

The following description provides greater detail regarding operational states of a mobile-enabled device, referred to below more generically as a "system." In at least one embodiment, the system includes a solar panel, a control unit, a battery, a lamp, an LCD unit, a clock, a tamper alarm and embedded modem components. Each component of the system may have a state of "on" or "off." Of course, other embodiments of the system may have greater, fewer, or different components with different states as needed for operation of the respective system.

The operational state of the system, including its various components, may vary according to one or more existing local conditions or inputs (that are particular to each system) and over-the-air command instructions (e.g., mobile network delivered), either or both of which can trigger a change in operational state of the system. These inter-linked operational states of the system determine the overall efficacy of the application provided to the consumer via the system by a service provider.

Figure 7:
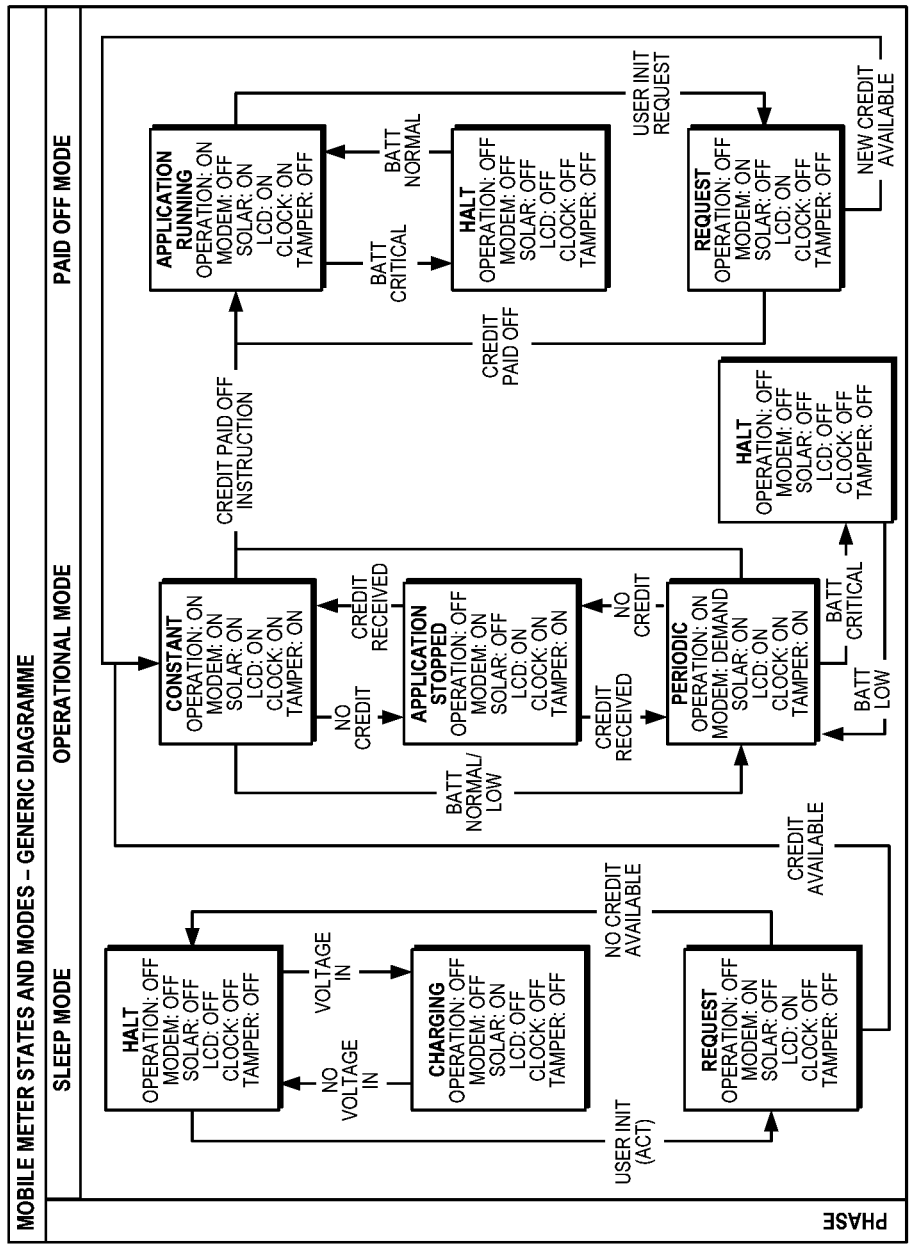
FIG. 7 illustrates various operational states of a solar-powered lamp according to an embodiment of the invention.

Referring now to FIG. 7, in at least one embodiment, the system has three principal operational states or modes:

"Sleep" mode, "Operational" mode, and "Paid Off" mode. Furthermore, there are sub-states within some of these modes, namely "Halt," "Constant," "Periodic," and "Request." The system mode or state is determined by the existing/current state plus a response to various types of inputs or commands. These inputs or commands can change at preset time intervals or in response to a real time clock that generates events based on the time of day. These inputs or commands can also be received from remote device management software (e.g., delivered over the air) or through local user-initiated input.

Commencing with the Sleep mode, Halt state shown in FIG. 7 (otherwise referred to herein as "Sleep-Halt" state), all system components are turned "off." The purpose of this state is to reduce the impact of the system components on the battery during shipping, for example, and to prevent unauthorized use of the system before the system has been deployed and properly activated. In Sleep mode, limited functions of the system may be available to allow the unit to be prepared for delivery to an end user. For example, Sleep mode may be configured to allow the system to be delivered with a fully-charged battery.

In FIG. 7, when a charging event takes place, e.g., by providing a voltage input to the system, the system moves from the Sleep-Halt state to a Sleep mode, Charging state (otherwise referred to herein as "Sleep-Charging" state). Some limited functionality may become available in the Sleep-Charging state, such as an indication to the user that the battery is being charged, e.g., by way of a lighted LED. However, in this state, other system components including the modem, clock, and LCD display remain "off." In this embodiment, events such as the voltage input being removed or the battery charge level becoming critically low will cause the system to return to the lowest power state, namely the Sleep-Halt state to avoid damaging the battery by causing a total discharge.

Either periodically, at a frequency determined by the provider of the system/service, or by initiation from a button press on the equipment, the system may move from one operational state to another operational state. For example, while the system is in the Sleep-Halt state, a user of the system may request activation of the system and the system will move into a Sleep mode, Request state (otherwise referred to herein as "Sleep-Request" state), as illustrated in FIG. 7. In this state, a number of steps (or sub-states) may be implemented to carry out a communication process to determine if credit is available for operation of the system, as described earlier herein. The sub-states in this regard may involve turning on the modem, verifying network availability, and communicating with a remote server (e.g., transaction processing system 300) that contains details of the user and their account status.

Based on a response from the server, the system may return from the Sleep-Request state to one of the other Sleep mode states or move from the Sleep-Request state to an Operational mode state. In the illustrated embodiment, the system uses a combination of network availability and credit being available (or provided) to the user to move to Operational mode, Constant state (otherwise referred to herein as "Operational-Constant" state). However, it is envisaged that other options are possible, such as communication from the server based on the time of day or the reported location of the system.

The Operational mode has a number of sub-states that are entered based upon parameters, such as the level of charge on the battery, to enable maximum use of the system while, in this example, protecting the battery chemistry.

In the illustrated embodiment, the system remains in the Operational-Constant state when the battery has sufficient charge that the application provided by the system (such as illuminating a lamp) is available to the user. In the Operational-Constant state, all of the system components are "on." In response to local input in the system, e.g., resulting from an event such as a low battery charge level, the system may change state from the Operational-Constant state to an Operational mode, Periodic state (otherwise referred to herein as "Operational-Periodic" state) where all system components are "on" except for the modem which communicates periodically on demand. The system may also change state to an Operational mode, Halt state (otherwise referred to herein as "Operational-Halt" state), where critically low battery conditions cause all system components to be set to "off," including the clock and modem, to prevent complete drainage of the battery.

The device may change state from Operational-Halt state back to the Operational-Periodic state and/or the Operational-Constant state in response to a change in battery charge level from critical to low and then to normal.

It should be noted that the modes described above do not necessarily map to system availability that is apparent to the user. For example, the battery may be charged sufficiently that the system is in the Operational-Constant state, yet the application provided by the system may not permit the consumer to use the charge in the battery in order to conserve a minimum charge for system communications. To the user, the unit does not appear operational but internally, the system remains capable of communicating, e.g., with a remote server such as the transaction processing system 300.

Conserving some charge in the battery while maintaining what looks to the user as a non-operational device has several benefits. This allows the service provider to maintain communications with the system for customer care purposes (e.g., sending a message to the user that the service provider has observed low battery conditions). It also allows the continuation of the tamper alerts should the system be subject to misuse (e.g., somebody trying to open the unit and remove the SIM, for example). If tampering is detected, a message may be communicated by the system to the service provider.

At some point in time, if the user has made sufficient payments to the service provider such that the capital value of the system is paid off (see, e.g., FIG. 6), the system is instructed by remote device management software (e.g., transaction processing system 300) to move into a Paid Off mode, Application Running state (otherwise referred to herein as "Paid Off-Application Running" state). At this time, all components are "on" except the modem and tamper alarm which are now "off." While in the Paid Off-Application Running state, the system may, in response to local data from events (such as low battery) change into a Paid Off-Halt state, where all components are "off," for reasons similar to those discussed above in regard to the Sleep-Halt state or the Operational-Halt state. The system may return to the Paid Off-Application Running state in response to charging the battery to a level where the system records it as no longer critical.

If the user decides to purchase a new product or upgrade the system, or in some way refinance the system through a new agreement with the service provider, the system can be instructed by a command (local or remote input) to return to the Operational Mode-Constant state. FIG. 7, for example, illustrates an implementation in which steps within a Paid Off-Request state result in the modem being turned "on" and the system allowed to communicate with the service provider to manage the new credit available for the new product purchase or system upgrade.

In the embodiments illustrated and described above, the apparatus (device or system) is shown as a solar-powered lamp. However, embodiments of the invention are not limited in this respect. It is to be understood that other devices or systems may be substituted for the solar-powered lamp. For example, more substantial equipment such as an electrical generator, an automobile, a radio, etc., may be used. Additionally, services that can be rendered by equipment may be provided in a manner described herein. As with the solar-powered lamp, the equipment in such apparatus provides a principal functionality other than communication with a remote computer, such as the transaction processing system 300.

As may be appreciated from the various implementations described herein, there are a variety of features and advantages obtained when configuring apparatus, such as a solar-powered lamp, as disclosed. Furthermore, although the invention has been described in connection with certain depicted implementations, those of ordinary skill will recognize that one or more features of a particular implementation described herein may be used in another implementation for similar advantage. Accordingly, it is not intended that the scope of the invention claimed herein in any way be limited by the precise forms described above, but instead be determined by reference to the claims that follow and equivalents thereto.

The embodiments of the invention in which an exclusive property or privilege is claimed are defined as follows:

1. An apparatus, comprising:
   a power unit configured to obtain power from a source that is not connected to a main electrical supply;
   equipment coupled to the power unit, wherein the equipment is configured to provide a principal functionality of providing power from the power unit to a device, wherein the equipment is operable to provide power to the device without being connected to the main electrical supply;
   a computing device configured to control the equipment; and
   a modem configured for wireless communication, wherein the modem is communicatively coupled to the computing device,
   wherein the apparatus is configured to operate in a plurality of modes including an operational mode and a paid off mode,
   wherein, when the apparatus is in the operational mode, the computing device is configured to:
   communicate with a remote computer via the modem and in response, receive from the remote computer an instruction that is based on a state of a financial account in which an amount is owed at least initially for a capital cost of the apparatus and payments made are credited toward the capital cost of the apparatus, and
   based on the received instruction, control whether the equipment provides the principal functionality,
   wherein, when the apparatus is in the paid off mode, at least the capital cost of the apparatus is paid off and the equipment provides the principal functionality without being controlled by the computing device based on the state of the financial account, and
   wherein the apparatus is configured to transition from the operational mode to the paid off mode in response to receipt of a wireless communication from the remote computer resulting from the amount owed in the financial account being paid off.

2. The apparatus of claim 1, further comprising an interface communicatively coupled to the computing device, wherein the computing device is configured to:
   receive an input via the interface requesting that the equipment provide the principal functionality; and
   in response to receiving the input, communicate with the remote computer via the modem and receive, from the remote computer, an instruction that is based on the state of the financial account.

3. The apparatus of claim 2, wherein the interface is a user interface configured to receive input from a user local to the apparatus.

4. The apparatus of claim 2, wherein the plurality of modes further includes a sleep mode in which the equipment is prevented from providing the principal functionality, and
   wherein the apparatus is configured to transition from the sleep mode to the operational mode in response to receipt of a wireless communication from the remote computer resulting from availability of a credit based on the state of the financial account.

5. The apparatus of claim 4, wherein the power unit comprises a battery, and when the apparatus is in the sleep mode, the apparatus is functional only to charge the battery using power obtained from the source, to receive an input via the interface, and to receive a wireless communication from the remote computer.

6. The apparatus of claim 4, wherein, when the apparatus is in the sleep mode, the computing device is configured to:
   receive an input via the interface requesting that the equipment provide the principal functionality; and
   in response to receiving the input, communicate with the remote computer via the modem and receive, from the remote computer, an instruction that is based on the state of the financial account.

7. The apparatus of claim 4, wherein the apparatus further comprises a tamper alarm configured to signal unauthorized handling of the apparatus,
   wherein, when the apparatus is in the sleep mode or the operational mode, the tamper alarm is functional and if a tamper event is detected, the apparatus is configured to limit functionality of the apparatus and signal the tamper alarm, and
   wherein, when the apparatus is in the paid off mode, the tamper alarm is not functional.

8. The apparatus of claim 1, wherein the apparatus is configured to transition from one mode to another mode in response to occurrence of an event local to the apparatus.

9. The apparatus of claim 8, wherein the event is based on a time of day.

10. The apparatus of claim 8, wherein the event is based on a location of the apparatus.

11. The apparatus of claim 1, wherein one or more of the plurality of modes has multiple sub-states, and
    wherein the apparatus is configured to operate in one of the sub-states based on a parameter determined within the apparatus.

12. The apparatus of claim 11, wherein the power unit comprises a battery local to the apparatus, and wherein the parameter is a charge level of the battery.

13. The apparatus of claim 12, wherein, based on the charge level of the battery, the computing device is configured to prevent the apparatus from providing the principal functionality while allowing wireless communication with the remote computer via the modem.

14. The apparatus of claim 11, wherein different functionality of the apparatus is allowed or prevented depending on the sub-state in which the apparatus is operating.

15. The apparatus of claim 1, wherein the apparatus is configured to transition from the paid off mode to the operational mode in response to receipt of a wireless communication from the remote computer resulting from availability of a new credit resetting an amount owed in the financial account.

16. A system, comprising:
an apparatus that includes:
a power unit configured to obtain power from a source that is not connected to a main electrical supply;
equipment coupled to the power unit, wherein the equipment is configured to provide a principal functionality of providing power from the power unit to a device, wherein the equipment is operable to provide power to the device without being connected to the main electrical supply;
a computing device configured to control the equipment; and
a modem configured for wireless communication, wherein the modem is communicatively coupled to the computing device,
wherein the apparatus is configured to operate in a plurality of modes including an operational mode and a paid off mode,
wherein, when the apparatus is in the operational mode, the computing device is configured to:
communicate with a remote computer via the modem and in response, receive from the remote computer an instruction that is based on a state of a financial account in which an amount is owed at least initially for a capital cost of the apparatus and payments made are credited toward the capital cost of the apparatus, and
based on the received instruction, control whether the equipment provides the principal functionality,
wherein, when the apparatus is in the paid off mode, at least the capital cost of the apparatus is paid off and the equipment provides the principal functionality without being controlled by the computing device based on the state of the financial account, and
wherein the apparatus is configured to transition from the operational mode to the paid off mode in response to receipt of a wireless communication from the remote computer resulting from the amount owed in the financial account being paid off; and
a remote computer configured to wirelessly communicate with the apparatus via a first communication link.

17. The system of claim 16, wherein the remote computer is configured to communicate with a user via a second communication link different than the first communication link.

18. The system of claim 17, wherein the remote computer is configured to receive a request from the user, via the second communication link, for a credit based on the state of the financial account, and
wherein, after a credit is made available, the remote computer is configured to transmit a wireless communication to the apparatus via the first communication link that causes the apparatus to transition to the operational mode.

19. The system of claim 17, wherein the remote computer is configured to receive payment information indicating that the amount owed in the financial account has been paid off and in response, the remote computer is configured to transmit a wireless communication to the apparatus via the first communication link that causes the apparatus to transition to the paid off mode.

20. A non-transitory computer-readable storage medium configured with computer-executable instructions that, in response to execution by a computer, cause the computer to:
wirelessly communicate, via a first communication link, with a remote apparatus, wherein the remote apparatus includes a power unit configured to obtain power from a source that is not connected to a main electrical supply, equipment coupled to the power unit and configured to provide a principal functionality of providing power from the power unit to a device, and a computing device configured to control the equipment, wherein the equipment is operable to provide power to the device without being connected to the main electrical supply, and wherein the apparatus is configured to operate in a plurality of modes including an operational mode and a paid off mode;
receive a request from a user of the apparatus, via a second communication link different from the first communication link, for a credit based on a state of a financial account, wherein the credit is applicable toward an amount that is owed at least initially for a capital cost of the apparatus;
in response to information indicating that a credit in the financial account is available, transmit a wireless communication to the apparatus that causes the apparatus to transition to the operational mode in which the computing device controls whether the equipment provides the principal functionality based on the state of the financial account; and
in response to payment information indicating that the amount owed in the financial account for at least the capital cost of the apparatus has been paid off, transmit a wireless communication to the apparatus that causes the apparatus to transition to the paid off mode in which the equipment provides the principal functionality without being controlled by the computing device based on the state of the financial account.

* * * * *